Sept. 21, 1965 T. W. BARGER 3,207,855

POSITIONING MECHANISM

Original Filed Aug. 22, 1960 5 Sheets-Sheet 1

THEODORE W. BARGER
INVENTOR

BY Robert G. Clay

ATTORNEY

Sept. 21, 1965 T. W. BARGER 3,207,855

POSITIONING MECHANISM

Original Filed Aug. 22, 1960 5 Sheets-Sheet 2

THEODORE W. BARGER
INVENTOR

BY Robert G. Clay

ATTORNEY

Sept. 21, 1965 T. W. BARGER 3,207,855

POSITIONING MECHANISM

Original Filed Aug. 22, 1960 5 Sheets-Sheet 3

THEODORE W. BARGER
INVENTOR

BY Robert G. Clay

ATTORNEY

Sept. 21, 1965 T. W. BARGER 3,207,855

POSITIONING MECHANISM

Original Filed Aug. 22, 1960 5 Sheets-Sheet 4

THEODORE W. BARGER
INVENTOR

BY Robert G. Clay

ATTORNEY

Sept. 21, 1965 T. W. BARGER 3,207,855

POSITIONING MECHANISM

Original Filed Aug. 22, 1960 5 Sheets-Sheet 5

THEODORE W. BARGER
INVENTOR

BY Robert G. Clay

ATTORNEY

United States Patent Office 3,207,855
Patented Sept. 21, 1965

3,207,855
POSITIONING MECHANISM

Theodore W. Barger, Redwood City, Calif., assignor to Ampex Corporation, Redwood City, Calif., a corporation of California Continuation of application Ser. No. 51,065, Aug. 22, 1960. This application Dec. 12, 1961, Ser. No. 158,836
14 Claims. (Cl. 179—100.2)

This application is a continuation of application Serial No. 51,065, filed August 22, 1960, and now abandoned.

This invention relates to mechanisms for positioning magnet tape guides members, and more particularly to means for positioning the concave guide member in a magnetic recording and reproducing system using a rotating magnetic head assembly.

In many magnetic recording systems a tape is moved across a fixed guide surface, or between guide elements, and a magnetic head assembly is positioned in three dimensions relative to the tape to effect signal recording or reproduction. A number of different expedients have been adopted in order to secure proper positioning of the head assembly, but the positioning problems presented by this type of system are far less than those presented by modern wideband recording systems. Wideband systems may introduce motion into the head assembly itself in order to provide sufficient relative head tape speed and thus obtain the necessary band width. In the region of the head assembly, such systems hold the tape in position in its longitudinal path by an adjustable concave guide mechanism. One widely used wideband recording system employs a rotating head assembly, in which the magnetic heads sweep substantially transversely across a tape that is cupped to conform to the arc of the heads by a cylindrical concave guide.

Satisfactory maintenance of the position of the concave guide assembly in the type of system just mentioned is, however, extremely difficult. There should be intimate and uniform contact between the tape and the heads throughout the arc of the individual heads and the pressure of such contact should be controllably variable so as to stretch the tape transversely to compensate for time-displacement errors, as disclosed in U.S. Patent No. 2,942,061, "Tape Transducing Apparatus," Pfost and Barnhart, issued June 21, 1960. Accordingly, the concave guide assembly must periodically be incrementally changed in position in order to provide the required change in pressure. Devices previously available for mounting and adjusting the concave guide assembly have not been easily operable to keep the proper juxtaposition between the concave guide and the head assembly during these incremental adjustments. Not only must the concave guide mechanism be originally aligned in direct opposition to the rotating head assembly, but when adjustments are made all parts of the concave guide mechanism should move uniformly in a direction parallel to the plane of rotation of the magnetic head assembly.

It is extremely important, of course, that the incremental positioning of the concave guide mechanism be accomplished simply, but with a high degree of precision. It is also desirable to utilize a positioning mechanism that can be operated to move the concave guide mechanism away from the rotating head assembly, in order to eliminate wear, when the recording system is not engaged in the recording or reproducing modes. Further, the concave guide mechanism should also be movable away from the head assembly, so that access may be had to the latter for tape loading and cleaning.

Modern developments in wideband recording systems also place additional and severe requirements on the positioning mechanism. The concave guide, for example, may be used for preheating the tape, prior to its passage across the rotating head assembly. The head assembly may in fact consist of two separate rotating assemblies, spaced axially apart a small distance so that they rotate in separate planes. These requirements dictate that the tape move longitudinally along an axis which is normal to the plane of rotation of the head assemblies and is properly spaced from the axis of rotation of the head assemblies. For these and other reasons, the positioning mechanism must maintain the concave guide mechanism in a proper attitude relative to the rotating head assembly, without tending to pivot or shift during initial positioning or subsequent incremental adjustments.

It is therefore an object of the present invention to provide an improved means for guiding magnetic tape.

Another object of the present invention is to provide an adjustable mechanism for guiding a magnetic tape past the head assembly of a wideband recording and reproducing system.

Yet another object of the present invention is to provide an incrementally adjustable positioning mechanism for moving the concave guide mechanism relative to a rotating head assembly in a magnetic recording and reproducing system.

A further object of this invention is to provide means for varying the operating pressure between a magnetic tape and a rotating transducing head.

A positioning mechanism in accordance with the present invention satisfies these and other purposes by supporting the concave guide mechanism on supporting members that maintain the guide mechanism in engagement with control members which position the guide radially relative to the magnetic head assembly. The supporting members confine the concave guide mechanism to a path of movement parallel to the plane of rotation of the magnetic head assembly.

In a specific example of an arrangement in accordance with the invention, the concave guide mechanism in a wideband recording and reproducing system, which utilizes rotating head assemblies, is held in a position in engagement with a pair of control arms by a number of elongated springs disposed in a parallelogram arrangement so as to maintain the concave guide with the axis of curvature at all times parallel with the axis of the rotating head assembly. The springs are adjustably mounted in a pivoted bracket that may be swung out of the way to permit access to the rotating head assembly. The pair of control arms are arranged to pivot about axes, which are displaced from the axis of the magnetic head assembly, and bear symmetrically against the curved face of the concave guide mechanism to control incremental positioning. Movements of the control arms are in turn governed by a tapered cam that is longitudinally movable with precision. Alternatively, the guide is retractable from the head assembly to facilitate tape movement for other than recording or reproducing purposes.

A better understanding of the invention may be had by reference to the following description, taken in conjunction with the accompanying drawings, in which.

Figures 1, 2A, 2B:
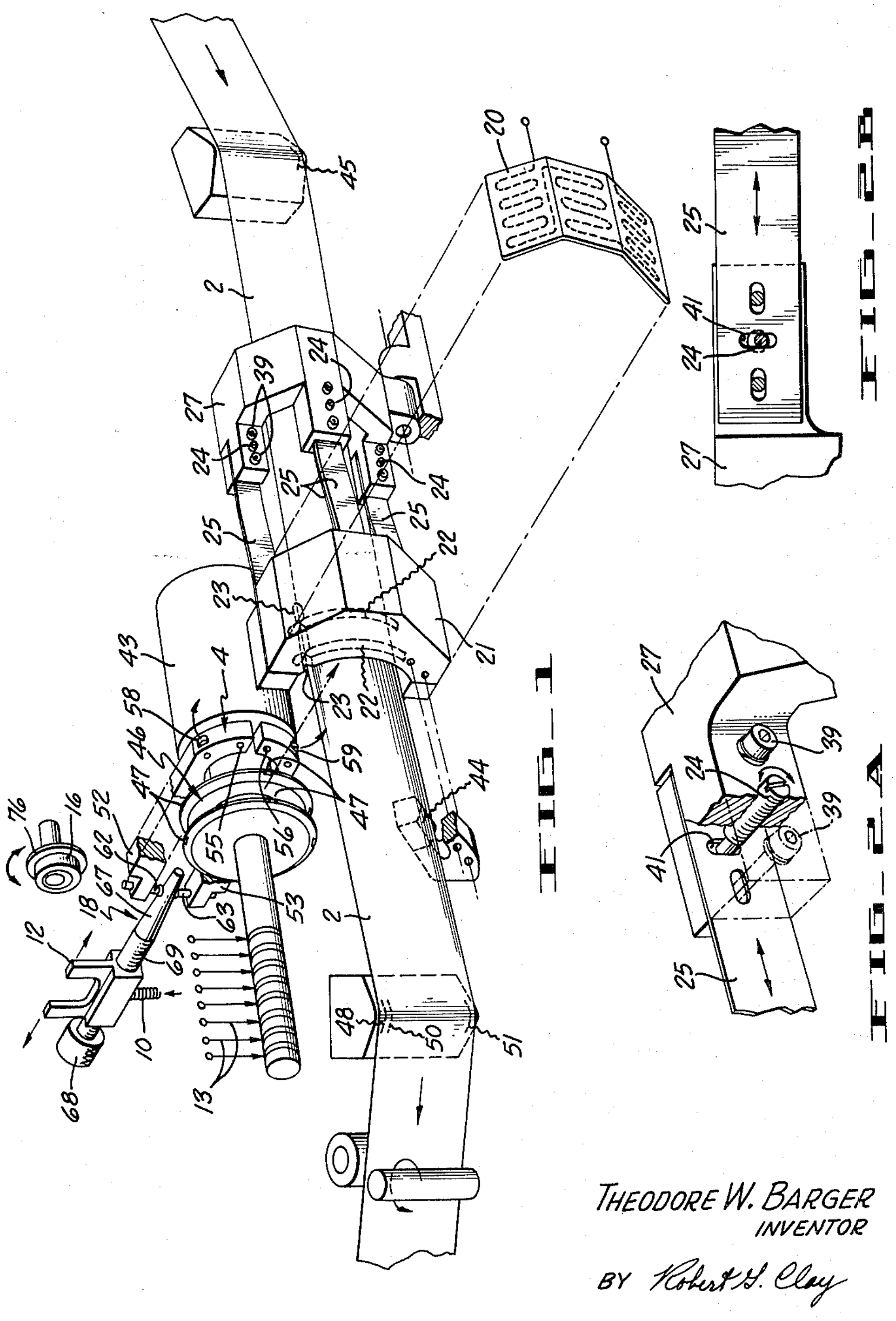
FIGURE 1 is a simplified perspective view, represented in exploded form, of the principal elements of the magnetic head assembly and concave guide mechanism of a wideband recording and reproducing system in accordance with the invention.
FIGURE 2A is a perspective view, to an enlarged scale and partially broken away, of the guide support portion of the positioning mechanism of FIGURE 1, showing a tape guide support spring and the arrangement for incrementally controlling its position.
FIGURE 2B is a rear view of the support mechanism of FIGURE 2A with the locking element removed.
Figure 5:
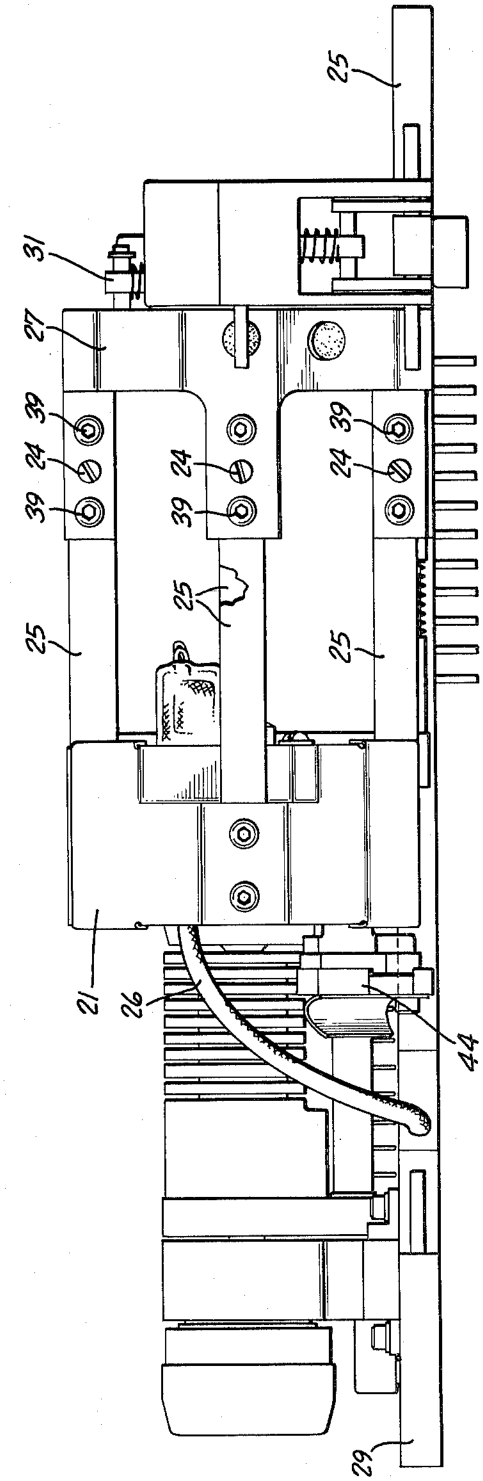
FIGURE 5 is a front view of the structure depicted in FIGURE 4.

For a general understanding of the manner in which the positioning arrangement of the invention is employed in a magnetic recording and reproducing system, reference may be made to FIGURE 1. In conjunction with a wideband recording and reproducing system, a magnetic tape 2 is moved between tape supply and takeup reels (not shown) and past a head assembly 46. The recording and reproducing system then records and reproduces wideband and high-frequency analog data or signals such as television program information on the tape 2. Betweeen the tape supply and takeup reels the tape is constrained by suitably positioned tape guides (not shown) to a longitudinal path as shown in FIGURE 1. With the tape 2 in proper position relative to the head assembly 46, magnetic heads 47 on the head assembly 46 are rotated by the drive motor 43 so as to sweep substantially transverse tracks extending across the tape 2. The transverse tracks are utilized for wideband analog information, whereas head 44, positioned on the down tape side of the head assembly 46 records and reproduces signal information along a longitudinal track for synchronizing the tape and head assembly speeds. Other heads, such as the heads 48 and 50 are selectively employed for erasure and for the recording of audio or auxiliary signals, and heads 45 and 51 are employed for monitoring system operation, but are incidental to a description of the invention. Electrical access to the rotating head assembly 46 is provided by a slip ring and wiper arrangement indicated by the arrows 13.

Figure 4:
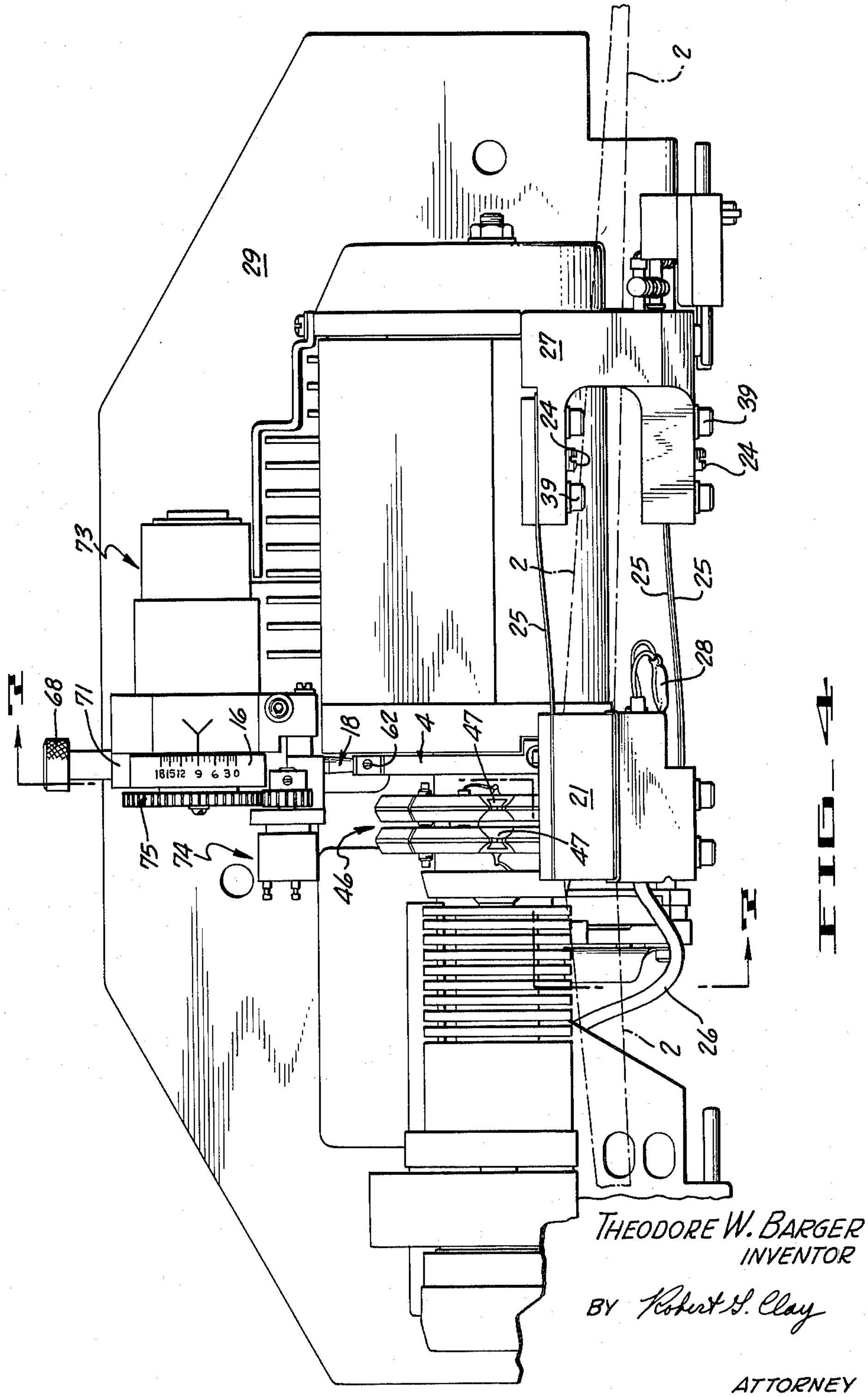
FIGURE 4 is a plan view of a magnetic head assembly and tape positioning mechanism in accordance with the invention.

It is important that the magnetic tape 2 be maintained in a specific cupped relationship to establish a uniform contact between the heads 47 and the surface of the tape 2 in a transverse direction across the tape. For this purpose, there is employed a concave guide mechanism 21 having a concave cylindrical surface that conforms to the arc defined by the rotating heads 47 of the head assembly 46. For improved control of the dimensional stability of the tape 2, relative to the head assembly 46, the concave guide mechanism 21 encloses a resistive heating element 20 for maintaining the tape at a uniform temperature. The heating element 20 is controlled by means of a thermistor 28 (FIGURE 4) connected to an electric cable 26. The longitudinal angles of exit and entry of the tape 2 relative to the guide axis are maintained so that the controlled tape tension provides component forces normal to the guide surface to maintain the tape in proper curvature conforming to the surface of the concave guide mechanism 21. For example, as shown in FIGURES 1 and 4, the tape is stretched by associated assembly of heads 45, 48, 50 and 51 so as to be bent away from the axis of the guide 21 at both ends.

Each rotating drum of the rotating head assembly 46 has a matching groove 22 formed in the confronting curved surface of the guide 21. In operation the guide 21 is so closely juxtaposed with respect to the heads 47 that the heads 47 extend into the grooves 22. The tape 2 is then stretched in the immediate vicinity of the heads 47 and depressed into the grooves 22. A groove 23 is also provided in the guide 21, parallel to the edge of the tape 2 where the tape is first contacted by the heads 47 in their rotation. As shown in FIGURE 4, the tape is stretched between the guide 21 and the mountings of the heads 45, 48, 50 and 51 at such an angle that the edge of the tape is constrained to curl back into the groove 23 (see FIGURE 6) and the rotating heads 47, therefore, first encounter a gently rounded portion of the tape so that the impact is reduced and any cutting action is avoided.

In operation, a number of particular requirements are imposed upon the operation of the positioning mechanism. The magnetic heads 47 are disposed in two separate groups of four each which are located in spaced apart planes on drums in the head assembly 46. The concave guide 21 must therefore keep the tape 2 along a line which is precisely normal to the plane of rotation of the head assembly 46. This must also be done in order to insure that the head moves properly past the heated area of the concave guide mechanism 21. In order for the transverse tracks to be recorded properly, changes in position of the concave guide 21 should not advance one edge of the tape 2 toward the head assembly 46 more than the other. A slight tilting of the top part of the concave guide 21 (as viewed in FIGURE 1) would cause excessive contact at the upper side of the tape 2 and insufficient head-to-tape contact at the other. The accuracy which is required in such respect is of the order of a few ten-thousandths of an inch. The positioning mechanism must maintain this order of precision, even though the concave guide 21 is to be retracted from the head assembly 46 for some purposes and substantially disengaged for others.

Figure 3:
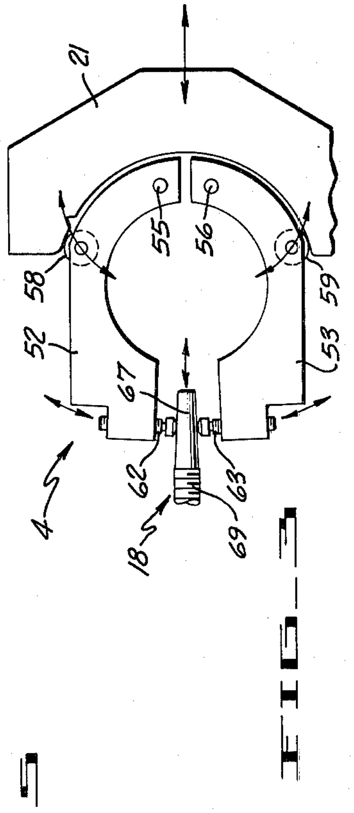
FIGURE 3 is a representation, to an enlarged scale, of a portion of the positioning mechanism of FIGURE 1.

The views of the recording and reproducing apparatus of FIGURES 4–7 illustrates one particular arrangement of the invention. The salient features of the invention can be better understood, however, from the simplified representation of FIGURE 1, to which principal reference will be made, together with the detailed sketches of portions thereof shown in FIGURES 2A, 2B and 3. The positioning mechanism is mounted on a frame 29 (FIGURE 4) having a fixed relation to the axis of rotation of the head asembly 46. It includes a support mechanism (FIGURES 2A and 2B), an incremental positioning mechanism (FIGURE 3) and a retracting mechanism (shown in FIGURE 7), although it will be recognized that there is an inter-relationship between the various elements and that the functional division of the positioning mechanism into these various parts has been made primarily for the sake of description.

Referring now generally to FIGURE 1, and the appropriate detailed figures, the support mechanism includes a spring base bracket 27 which is pivotally mounted on the frame 29 and which in an operating position is clamped or held by a toggle mechanism 31 (FIGURE 5) in an attitude that is parallel to that desired for the concave guide 21. In an alternate position (shown in dashed line outline in FIGURE 7) the spring base bracket 27 may be moved outwardly about its pivot axis by a desired angle, here approximately 30°, to move the associated concave guide 21 away from the head assembly 46 and permit access thereto for the insertion of tape and for cleaning.

The guide 21 is supported from the bracket 27 by four double cantilevered leaf springs 25 arranged in parallel, which are adjustably mounted at one end to the spring base bracket 27 and affixed at the other end to the concave guide 21. The support mechanism is such that the springs 25 maintain the guide 21 during operation in engagement with the positioning mechanism 4 which effects limited movement of the concave guide 21 radially toward and away from the axis of the rotating head assembly 46.

It will be noted (FIGURE 4) that the spring leaves 25 that are closest to the axis of the guide 21 are parallel to the spring leaves 25 that are farthest away, so as to form two opposite sides of a parallelogram, with the guide 21 and the bracket 27 forming the other pair of opposite sides of the parallelogram. Consequently, the guide 21, no matter how it is moved toward and away from the rotating head assembly 46 must maintain its own axis at an unchanging inclination to the axis of the head assembly; and if the axis of the guide is originally established parallel to the axis of the head assembly, this parallelism is not disturbed by such movement of the guide. While the actual path of translation of the guide 21 toward or away from the rotating head assembly may be said to be curvilinear, the component of motion parallel to the axis of rotation of the head assembly is of second order magnitude and can be tolerated within an operating system.

As here shown, the leaf springs 25 that are farthest away from the axis of the guide 21 are superimposed and doubled but they might be otherwise arranged, the essential condition being that there be at least as much spring restoring force on the side of the parallelogram farthest from the axis as on the side nearest, and that the spring leaves all remain relatively stiff in compression, and are so designed as to reduce parasitic deflections inherent in parallel spring arrangements.

Each of the leaf springs 25 includes a transverse slot 41 (FIGURES 2A and 2B) in which is registered an eccentric adjustment screw 24 mounted in the adjacent part of the spring base bracket 27. Through the use of the eccentric adjustment screws 24, the concave guide 21 may be axially set at a desired initial position with respect to the rotational planes of the magnetic heads 47 in the head assembly 46, and the cylindrical surface of the concave guide 21 may be placed in parallel relationship to the rotational axis of the head assembly 46. Locking screws 39 are disposed through corresponding longitudinal slots in the leaves and serve to maintain the setting, once it is established, and also act as guide pins to ensure that the movement of the leaves during setting is longitudinal only.

It will be seen (FIGURES 1 and 5) that at least two of the leaf springs 25 are spaced to be parallel in a vertical plane (as seen in these figures) so that once the adjustment screws 24 are set, the inclination of the guide axis in a vertical plane must remain constant, even when the guide is moved toward and away from the rotating head assembly.

It will also be seen that the spring arrangement above described permits limited twisting or torsional movement of the guide relative to the bracket 27, and about the axis of the bracket.

The function of this portion of the apparatus is summarized as follows. The screws 24 of the upper (or lower) leaf springs 25 (and to some degree, of the intermediate springs) are used to bring the axis of the guide 21 into a horizontal plane parallel to the axis of the head assembly 46. The screws 24 of the springs farthest from (or closest to) the axis of the guide 21 are used to bring the guide axis into a vertical plane parallel to the axis of the head assembly 46. Thus the guide axis is established to be rigorously parallel to the axis of the head assembly 46. All of the adjustment screws 24 are used to translate the guide 21 is an axial direction to bring the slots 22 into precise registry with the heads 47. Once the screws 24 are set, limited torsional movement of the guide 21 is permitted to raise or lower the axis of the guide with respect to the axis of the head assembly 46, while rigorously maintaining the parallelism of the two axes; and limited translation of the guide 21 is permitted in a horizontal direction toward and away from the head assembly 46, with the parallelism of the two axes being rigorously maintained during this movement also.

The actual position of the concave guide 21 is determined by the incremental positioning mechanism 4 against which the interior cylindrical surface of the concave guide 21 abuts. This mechanism 4 shown in clearest detail in FIGURE 3, in which the head assembly 46 and the tape 2 have not been shown and from which certain other details have been omitted for simplicity.

The mechanism 4 includes a pair of control arms 52, 53 disposed on opposite sides of a central plane intersecting the axis of rotation of the head assembly 46 and the longitudinal central axis of the tape 2. At the end of the control arms 52, 53 closest to the concave guide 21, the control arms are mounted to pivot about pivot pins 55, 56 which are affixed to the frame 29. From the pivot pins 55, 56 the control arms 52, 53 extend outwardly from the central plane to bearings 58, 59 which are in engagement with the cylindrical surface of the concave guide 21. The tape 2 conforms to this cylindrical surface and passes between the concave guide 21 and the control arms 52, 53 between the bearings 58, 59. Here it should be noted that the cylindrical surface forms a segment of a circle, the center of which lies in the central plane which includes the axis of rotation of the head assembly 46, and that the bearings 58, 59 are symmetrically spaced with respect to this central plane when correctly adjusted.

From the pivot pins 55, 56 the control arms 52, 53 extend away from the concave guide 21 to provide lever arms in the free ends of which cam followers 62, 63 are adjustably mounted. The cam followers 62, 63 are in the form of bolts threaded into the associated control arms 52, 53 and terminating at the adjacent ends in cam following surfaces. By adjustment of the cam followers 62, 63 the extent of protrusion of the cam follower surfaces may be controlled and the relative positions of the bearings 58, 59 may be changed so as to pivot the concave guide 21 about the pivot pins 55, 56, and so provide torsional movement of the guide 21 for raising or lowering the axis of the guide until the guide axis falls in the horizontal plane of the axis of the head assembly 46.

Figure 6:
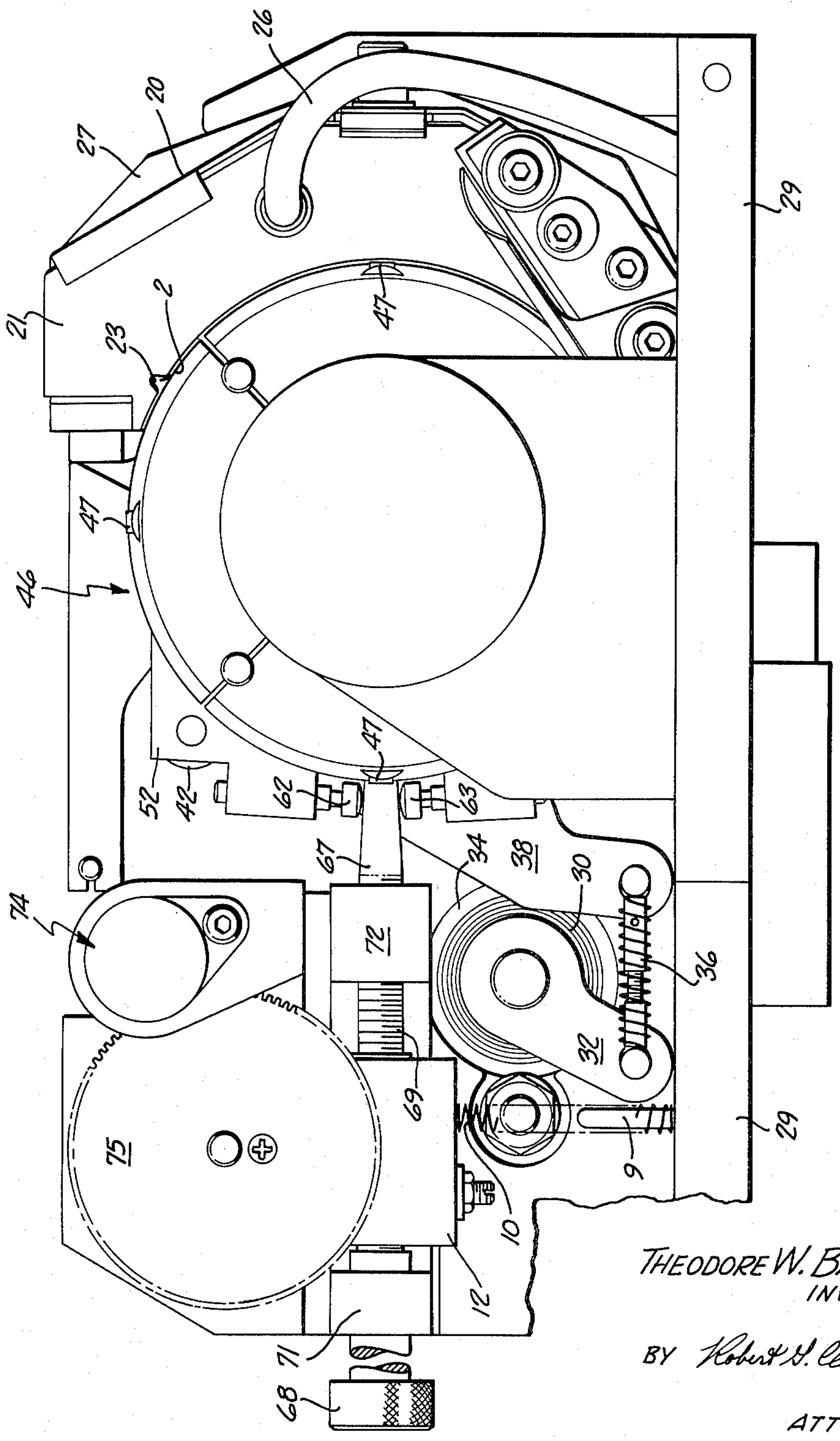
FIGURE 6 is an end view, to an enlarged scale, of the structure depicted in FIGURE 4.

A tapered cam 18 of generally cylindrical form is mounted to include a tapered end 67 in registry with the cam followers 62, 63 at the cam follower surfaces. At the opposite end, the tapered cam 18 is provided with means for adjustment, here shown as a knurled knob 68 although this may be a micrometer adjustment, a lever mechanism, or the like. Along an intermediate portion of its length, the tapered cam 18 includes a threaded portion 69 which extends through, and is movable relative to, a yoke 12 which is slidable in the frame 29 in a direction parallel to the elongated axis of the tapered cam 18. The tapered cam 18 is confined to a movement directly toward or away from the concave guide 21 in the central plane by guide elements 71, 72 (FIGURE 6) which are affixed to the frame 29. This direction of movement is the direction of translation which is desired for the concave guide 21. The precise position of the slidable yoke 12 along the axis which extends in the direction of the translation is determined by an eccentric bearing 16 which is rotatably mounted in the frame 29. The eccentric bearing 16 is rotated by a servo motor 73 for adjusting the position of the slidable yoke 12, the taper cam 18, and thereby the concave guide 21. Graduations on the eccentric bearing 16 provide a precise indication of the position of the concave guide 21. Generally the bearing 16 is established at its central position (here shown as the indicium "9") during record operation and is away from control position only during reproduce operation. Accordingly a potentiometer 74 is geared to the bearing 16, so as to provide a sensing of the deviation of the servo 73 from null position so that the servo can be returned to null when it is desired to record. Alternatively of course, the bearing 16 may be rotated manually, either by rotating the gear 75, or by means of a knob (not shown) replacing the motor 73. A spring 10 (FIGURE 6), held in position by a pin 9 attached to the frame 29, exerts pressure against the yoke 12 so directed as to rotate the latter against the eccentric bearing 16 (in a counterclockwise direction as seen in FIGURE 6), and about the axis of the taper cam 18 (in a clockwise direction as seen from the tapered end of the cam 18). This arrangement serves to eliminate backlash and prevent excessive play between the various parts of the gap setting mechanism by holding the taper cam firmly in contact with the guide element 72 and by holding the upper part of the yoke 12 firmly in contact with the flange 76 on bearing 16. A set screw 11 is provided for locking the yoke 12 in position along the taper cam 18, once the desired setting is established.

It will be seen that the mechanism so far described is useful in a system such as that disclosed in U.S. Patent 2,942,061 previously mentioned. In such a system, a time-base signal is pre-recorded on the tape and is sensed by the rotating head during reproduce operation to provide an error signal. The error signal is used to control the position of the concave tape guide so that the tape is stretched more tightly or less tightly over the projecting head as the head sweeps the grooved guide. This controlled stretching of the tape is used to correct for time-displacement errors in the tape signal. For adapting the device of the present invention to such a system, the servo motor 73 is connected to receive the error signal during reproduce operations and functions to move the taper cam in response thereto, changing the position of the guide 21 and correcting the head-to-tape pressure and tape stretch. When the machine returns to record mode, the taper cam and the guide are returned to neutral position with assistance of the potentiometer 74, as above described.

The disengagement mechanism (referring now particularly to FIGURE 7) is in the form of a cam linkage which cooperates with the control arms 52, 53. For this purpose, the control arms 52, 53 are provided with follower bearings 42. A generally diagonally disposed cam 78 is mounted about a cam pivot 79 which is fixed to the frame 29 in the central plane. In a first position, opposite sides of the cam 78 are out of engagement with the follower bearings 42 when the cam followers 62, 63 are in engagement with the tapered end 67 of the tapered cam 18. In a second position, however, the cam 78 is pivoted counterclockwise in FIGURE 7 about the pivot 79 such that the surfaces engage the follower bearings 42 to separate the free ends of the control arms 52, 53. A spring retained link 36 is coupled between a cam arm 38 and a crank 32. The crank 32 is affixed to a solenoid 34 which, when energized, drives the crank 32 in a clockwise direction, thus moving the retracting cam 78 to its first position. When the solenoid 34 is de-energized, a clockspring 30 forces the crank 32 and cam 78 to the second position. The spring retained link 36 provides adjustment of the distance between the crank 32 and the arm 38. The solenoid 34 is energized whenever the system is in the recording and reproducing modes of operation, thus maintaining the concave guide 21 at the position established by the taper cam 18 for these modes.

In operation, the positioning mechanism shown operates to constrain the concave guide 21 to a translational movement toward or away from the head assembly 46, thus holding all points of the concave guide 21 in the same attitude relative to the head assembly 46. Through adjustment of the cam followers 62, 63, before actual operation, the bearings 58, 59 may be shifted relative to each other so that although both bear on the cylindrical surface of the concave guide 21, the alignment of the concave guide 21 is such that the cylindrical surface thereof is concentric with the axis of rotation of the head assembly 46, or at least with the guide axis in a horizontal plane (FIGURE 7) passing through the axis of the head assembly 46. Thereafter, equal adjustments may be made in the control arms 52, 53, as by means of the tapered cam 18 and knob 68, so as to effect the desired incremental positioning of the concave guide 21.

In a typical sequence of operations, the tape is loaded against the concave guide 21 by pivoting the spring base bracket 27, thus disengaging the guide 21 from the head assembly 46, to permit entry of the tape 2 between the head assembly and the concave guide. With the cam followers 62, 63 adjusted, as above described, and the eccentric adjustment screws 24 set so that the concave guide 21 has the proper axial inclination, i.e. parallel to the axis of the head assembly 46, the positioning mechanism 4 may then be operated so as to provide, alternatively, incremental positioning of the concave guide 21 or retraction of the concave guide 21 from the head assembly 46.

Axial adjustment of the taper cam 17 by the knurled knob 68 in the direction of translation provides a general or approximate range setting control. By this adjustment of the position of the tapered cam 18, the concave guide 21 may be moved to the middle of a range in which incremental adjustments are to be made. The eccentric bearing 16 may then be rotated by the servo 73, producing further and more precise incremental shifts of the position of the taper cam 18 and the desired movement in the direction of translation for the concave guide 21.

The translation which is introduced into the concave guide 21 is extremely precise, and varies incrementally with incremental changes in the position of the eccentric bearing 16. When the bearing 16 is rotated so that the tapered cam 18 advances toward the concave guide 21, for example, the bearings 58, 59 become further separated and translate the concave guide 21 in a direction away from the head assembly 46. If a straight line is drawn between the contact points of the bearings 58, 59 in each of these positions, the lines will be seen to be parallel but spaced apart by an incremental amount that is a function of the incremental shift in the position in the direction of translation of the concave guide 21. The arrangement utilizes the fixed radius of the cylindrical surfaces of the guide 21 together with the symmetrical arrangement of the bearings 58, 59 to effect controlled positioning.

Similarly, when the tapered cam 18 is retracted instead of advanced relative to the concave guide 21, the bearings 58, 59 are pivoted toward the head assembly 46 and toward each other, permitting the concave guide 21 to translate closer to the head assembly 46.

Figure 7:
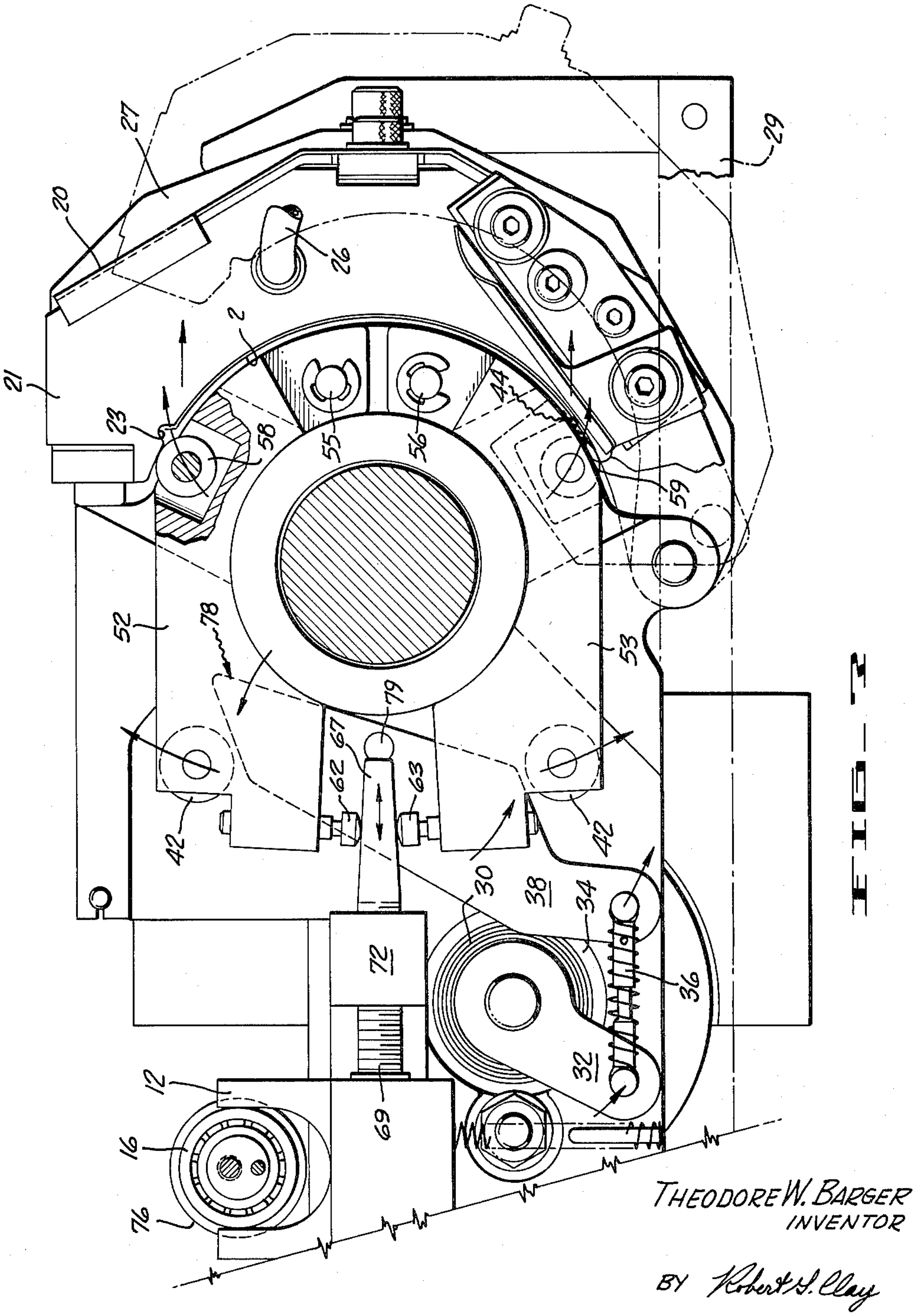
FIGURE 7 is a sectional view, to an enlarged scale, taken along the line 7—7 in FIGURE 4.

When it is desired to retract the concave guide 21, the retracting mechanism (FIGURE 7) automatically operates as soon as control exerted by the solenoid 34 terminates. Thus, when the system is no longer employed in either a reproducing or recording mode, the solenoid 34 permits the clockspring 30 to rotate the cam 78 counterclockwise (as seen in FIGURE 7) and to rotate the opposite sides of the cam 78 against the associated follower bearings 42. This action pivots the control arms 52, 53 outwardly from each other, moving the bearings 58, 59 so as to translate the concave guide 21 away from the head assembly 46. The extent of movement of the concave guide 21 which is derived through this action is at least several times greater than the range of movement provided by the yoke 12 and taper cam 18 and is efficient to completely disengage the tape from contact with the rotating heads. The concave guide 21 thus takes the tape 2 out of contact with the head assembly 46, but does not disturb the setting of the tapered cam 18 or the cam followers 62, 63.

As soon as the system is to be operated in a reproducing or recording mode, therefore, actuation of the solenoid 34 overcomes the mechanical bias exerted by the clockspring 30 and rotates the cam 78 clockwise to the position shown in FIGURE 7 so that the sides of the cam 78 are moved with the follower bearings 42. The deformation of the leaf springs 25 (FIGURE 1) translates the concave guide 21 and the control arms 52, 53 (FIGURE 7) back to a position in which the cam followers 62, 63 are in engagement with the tapered ends 67 of the taper cam 18. The system therefore is returned to the exact incremental setting established previously by the eccentric bearing 16, although of course it is desirable to return the bearing 16 to its own central position whenever the apparatus is returned to record operation, as above described. With positioning mechanisms in accordance with the present invention, tape is positioned in a desired attitude, adjacent to a magnetic head assembly with a substantial range of adjustment, also being provided. In a practical arrangement in accordance with the invention, the tape is held in precise position as it moves past a preheating section and the two rotating head assemblies with a longitudinal tension along the tape.

The arrangement is particularly suitable for practical applications, because it requires relatively inexpensive parts and does not interfere with normal operation of the recording system. The tape is quickly and automatically retracted from contact with the magnetic heads and, similarly, re-engaged to the same incremental setting previously established. Furthermore, without disturbing the setting of the positioning mechanism, the concave guide mechanism is selectively moved out of the way to permit the tape to be loaded into the system.

While a specific example of a positioning mechanism in accordance with the invention has been described, it will be appreciated that a number of changes will suggest themselves to those skilled in the art when faced with different applications of the invention. Accordingly, the invention should not be considered to be limited to the example given, but should be taken to include all modifications, variations and alternative forms falling within the spirit and scope of the invention as set forth in the appended claims.

What is claimed is:

1. An adjustable positioning mechanism for a concave guide mechanism which holds a magnetic tape in curved concentric relation to a rotating head assembly, including the combination of a supporting means coupled to the concave guide mechanism for constraining the concave guide to a translation with the axis thereof parallel to the axis of rotation of the rotating head assembly, said supporting means being arranged for substantial freedom of torsional rotation of said concave guide mechanism about a third axis that is parallel to said head assembly axis, and adjustable incremental positioning means engaging the concave guide mechanism, including pivotally mounted control arm means symmetrically engaging the concave guide mechanism, and means for pivoting the control arm means to effect said translation and said torsional rotation of the concave guide mechanism.

2. An adjustable positioning mechanism for a concave guide mechanism having a curved guide surface which holds a magnetic tape in curved, contacting concentric relation to a rotating head assembly including the combination of an adjustable positioning means, and a plurality of cantilever elements affixed to the concave guide mechanism and mechanically biasing the concave guide mechanism against the positioning means, the cantilever elements being disposed to constrain the concave guide mechanism to a translation with the axis thereof substantially parallel to the axis of rotation of the head assembly, said cantilever elements being arranged for substantial freedom of torsional rotation of said concave guide mechanism about a third axis that is parallel to said head assembly axis, the adjustable positioning means including a pair of pivotally mounted control arms engaging the curved guide surface, and means mechanically engaging the control arms for pivoting the control arms to a selected position to retract the concave guide mechanism from the rotating head assembly and to effect said torsional rotation thereof.

3. A positioning mechanism for a magnetic tape guide for holding a magnetic tape in selected positions relative to a head assembly including a combination of an adjustable positioning means, and a cantilever means coupled to the tape guide for maintaining the guide in engagement with the positioning means and for constraining the guide to a selected direction of translation with the axis thereof parallel to the axis of said head assembly while providing substantial freedom of torsional rotation of said guide about a third axis that is parallel to the axis of said head assembly, whereby said adjustable positioning means positions the tape guide relative to the head assembly.

4. A system for holding a magnetic tape in curved contacting relation to a rotating head assembly and for adjusting a position of the tape relative to the head assembly including a concave guide mechanism having a curved cylindrical surface in mating relation with the peripheral arc of the rotating head assembly, a pair of pivoted control arms, means for urging the curved cylindrical surface of the concave guide mechanism into contact with said control arms with the axis of said guide parallel to the axis of said head, said means providing substantial freedom of torsional rotation of said concave guide about a third axis that is parallel to the axis of said rotating head assembly, said pivoted control arms engaging the curved surface symmetrically about a midpoint relative to the rotating head assembly, and longitudinally movable cam means engaging the control arms to provide selected amounts of pivotal movement thereof, whereby engagement of the control arms with the curved surface determines the position of the curved surface relative to the rotating head assembly.

5. An adjustable positioning mechanism for a concave guide mechanism utilized in mating, spaced apart relationship for a rotating head assembly in a wideband recording and reproducing system in which the rotating head assembly rotates about an axis of rotation and the concave guide mechanism maintains the magnetic tape in cupped contacting relation to the magnetic head assembly as the tape is moved longitudinally parallel to the magnetic head assembly, including the combination of a frame, a pivoted support bracket mounted adjacent the concave guide mechanism in the frame and pivotable with respect thereto, the bracket being pivotable between first and second positions close to and spaced apart from the rotating head assembly, cantilever leaf spring arms axially adjustably mounted on the bracket and coupled at their free ends to the concave guide mechanism, the cantilever leaf spring arms being spaced apart such that when the bracket is in the first position the cantilever leaf springs urge the concave guide mechanism constraining the concave guide mechanism to a curvilinear translation in which the parts of the concave guide mechanism remain in parallelism relative to the rotating head assembly as the concave guide mechanism is moved toward or away from the assembly, a pair of pivoted control arms each pivotally mounted at a different point spaced symmetrically with respect to a central plane passing through the axis of rotation of the rotating head assembly and the central longitudinal axis of the magnetic tape, and including contacting surfaces symmetrically engaging the cylindrical surface of the concave guide mechanism, adjustable cam follower means mounted in each of the control arms and including cam follower surfaces disposed in adjacent relation, taper cam means including a taper cam surface engaging the cam follower surfaces, the taper cam means being longitudinally movable in the direction of translation of the concave guide mechanism, a slidable yoke mechanism adjustably coupled to the taper cam means, eccentric bearing means engaging the slidable yoke for incrementally varying the position of the slidable yoke and the coupled taper cam means, thereby to change the position of the contact point relative to the cylindrical surface and to effect translation of the concave guide mechanism and retracting means selectively coupled to the control arms for pivoting the control arms to a selected position in which the concave guide mechanism is maintained spaced apart from the rotating head assembly such that the tape is out of contact with the rotating head assembly.

6. A positioning mechanism for a tape guide of a magnetic tape recording and reproducing system employing a rotating head assembly, including a tape guide having an interior curved surface for holding magnetic tape against the rotating head assembly, a tape guide support assembly including a support bracket and a plurality of cantilevered leaf springs for suspending the tape guide from the support bracket, means for adjusting the position of individual springs in order to maintain the axis of the tape guide parallel to the rotational axis of the head assembly, means for retaining the support bracket in a first position, said support bracket being pivotable between the first position where the tape guide mechanism engages the head assembly and a second position where the tape guide is disengaged therefrom, and means for alternatively controlling the position of the tape guide in a translational direction with respect to the plane of rotation of the head assembly.

7. A tape guide positioning mechanism in accordance with claim 6 wherein said controlling means comprises a pair of control arms bearing against the interior curved surface of the concave guide, incrementally adjustable positioning means for controlling a first position of the control arms and camming means for establishing a second position of the control arms without disturbing the setting of the incrementally adjustable positioning means.

8. A tape guide positioning mechanism in accordance with claim 7 wherein the incrementally adjustable positioning means comprises a pair of threaded bolts individually attached to corresponding control arms and having camming surfaces on the heads thereof, a taper cam having a tapered surface bearing against the head surfaces, a yoke threaded on the taper cam, and an eccentric bearing coupled to the yoke for determining the position of the yoke and taper cam in the axial direction of the taper cam.

9. A tape guide positioning mechanism for a magnetic tape recording and reproducing system having a rotating head assembly including a tape guide having an interior curved surface to be maintained in a predetermined relationship with the head assembly, pivoted means, adjustable spring means for urging the concave guide mechanism into engagement with the pivoted means, said spring means being adjustable to constrain the movement of the tape guide to a translational direction relative to the plane of rotation of the head assembly, the pivoted means determining the spacing of the guide from the rotating head assembly and including a pair of lever arms, means for incrementally adjusting the position of the lever arms within a predetermined range corresponding to a first position of the arms, and means for moving the lever arms through a substantially greater distance to a second position thereof without affecting the setting of the incrementally adjustable positioning means.

10. Apparatus for establishing two different positions of a movable element comprising a pair of symmetrical lever arms pivotally mounted at one end thereof, a taper cam bearing against the other ends of the lever arms, incremental positioning means for adjusting the first position of the movable element including means for moving the taper cam incrementally in an axial direction and a second cam for moving the lever arms independent of the setting of the taper cam.

11. Apparatus in accordance with claim 10 wherein said positioning means comprises at least one adjustable member coupled to a lever arm for controlling the position of the lever arm relative to the taper cam.

12. Apparatus in accordance with claim 10 wherein said moving means comprises a yoke, an eccentric bearing for moving the yoke in the longitudinal direction of the taper cam, and means for locking the yoke in position on the taper cam.

13. Apparatus in accordance with claim 12 wherein the yoke and the taper cam are threaded and means are included for incrementally adjusting the position of the taper cam relative to the yoke.

14. An incremental positioning apparatus comprising a pair of lever arms pivotably mounted at one end and bearing against an element to be controlled in one or the other of two positions, a threaded cam pin having a tapered surface bearing against the ends of the arms remote from the pivoted ends, a yoke mounted along the length of the cam pin, means for establishing the position of the yoke along the cam pin by rotating the pin relative to the yoke, locking means for maintaining a particular selected position of the yoke relative to the cam pin, means for incrementally moving the yoke and cam pin in a longitudinal direction including an eccentric bearing coupled to the yoke, and means inserted between the cam pin and the respective lever arms for individually adjusting the spacing of the lever arms relative to the cam pin.

References Cited by the Examiner

UNITED STATES PATENTS

| | | | |
|---|---|---|---|
| 2,921,990 | 1/60 | Ginsburg et al. | 179—100.2 |
| 2,942,061 | 6/60 | Pfost et al. | 179—100.2 |
| 3,099,709 | 7/63 | Barry | 179—100.2 |

FOREIGN PATENTS

| | | |
|---|---|---|
| 216,562 | 12/57 | Australia. |

IRVING L. SRAGOW, *Primary Examiner.*

BERNARD KONICK, *Examiner.*